April 13, 1926.

Re. 16,325

W. N. OEHM ET AL

NAILING MACHINE

Original Filed Dec. 2, 1920 2 Sheets-Sheet 1

Inventors:
William N. Oehm
Comert Powell
By Gillson & Gillson.
Attys.

April 13, 1926.
Re. 16,325
W. N. OEHM ET AL
NAILING MACHINE
Original Filed Dec. 2, 1920 2 Sheets-Sheet 2
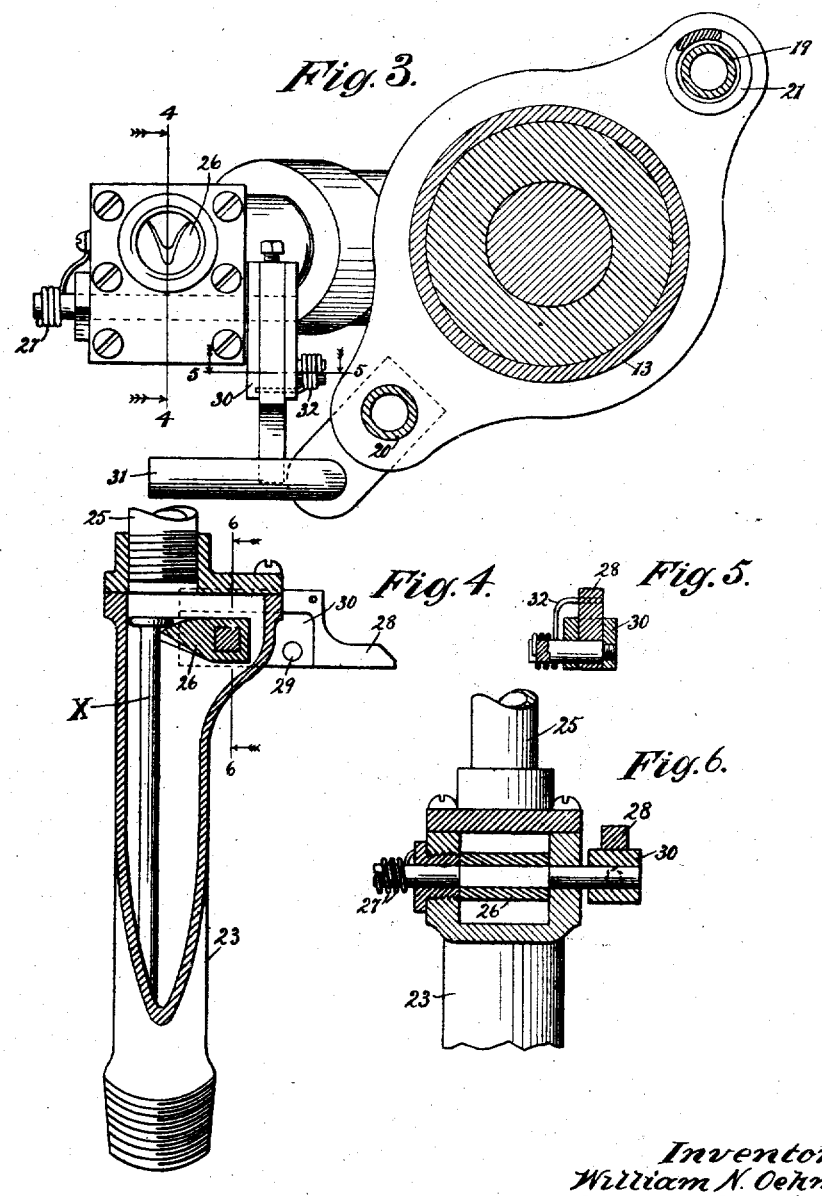
Inventors:
William N. Oehm
Gomert Powell
By Gillson & Gillson
Attys.

Reissued Apr. 13, 1926.

Re. 16,325

UNITED STATES PATENT OFFICE.

WILLIAM N. OEHM AND GOMERT POWELL, OF MICHIGAN CITY, INDIANA.

NAILING MACHINE.

Original application filed December 2, 1920, Serial No. 427,321. Divided and application filed July 20, 1921, Serial No. 486,113. Original No. 1,418,226, dated April 11, 1922. Application for reissue filed November 20, 1922. Serial No. 602,172.

*To all whom it may concern:*

Be it known that we, WILLIAM N. OEHM and GOMERT POWELL, citizens of the United States and Holland, respectively, and residents of Michigan City, county of La Porte, and State of Indiana, have jointly invented certain new and useful Improvements in Nailing Machines, of which the following is a specification, and which are illustrated in the accompanying drawings, forming a part thereof.

The invention relates to a nailing machine including a pneumatic hammer and adapted especially for driving the nails in floor boards, particularly the flooring of cars.

The objects of the invention are to provide for the ready shifting of the machine and permanently positioning it for driving a nail; to provide a simple and efficient nail-feeding device, and to secure rapidity of operation.

An embodiment of the invention is illustrated in the accompanying drawings, in which—

Fig. 3 is a plan section on the line 3—3 of Fig. 1;

Fig. 4 is a sectional view on the line 4—4 of Fig. 3;

Fig. 5 is a detail section on the line 5—5 of Fig. 3; and

Fig. 6 is a detail section on the line 6—6 of Fig. 4.

Figure 1:
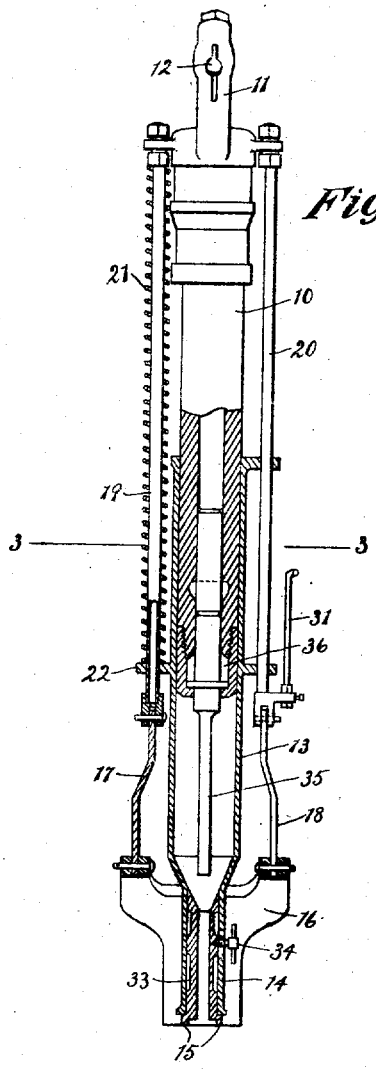
Fig. 1 is a longitudinal section of the machine, partly in elevation, on the line 1—1 of Fig. 2.
Figure 2:
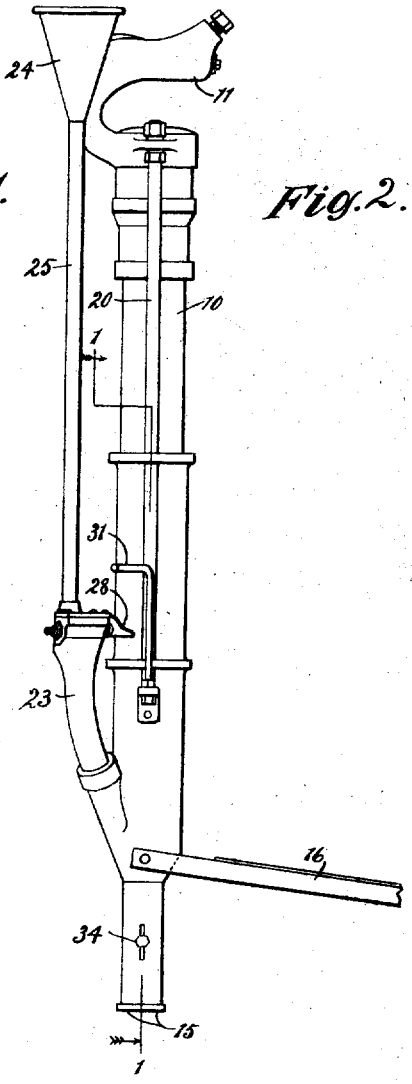
Fig. 2 is a side elevation of the machine.

The machine comprises a pneumatic hammer, conventionally shown at 10, and which may be of any desired construction having the usual handle 11 and controlling valve 12. This hammer telescopically enters a tube 13, the lower end 14 of which is contracted to form a nipple and positioned in this nipple is a bushing 33 provided with spurs 15 which will engage the board into which the nail is to be driven and hold the machine in proper position.

A pedal 16, adapted to have its outer end loosely rest upon the floor, is connected by means of links 17, 18, to a pair of pull rods 19, 20, attached to the upper end of the hammer casing, and a spring 21, coiled about one of the rods, as 19, and reacting between the upper end thereof and a guide bracket 22 attached to the tube 13, normally holds the hammer in elevated position.

A feed tube 23 enters the tube 13 laterally for delivering nails thereto, and which are fed through the feed tube from a suitable receptacle, such as a funnel 24, connected therewith by means of a tube 25. The size of the tube 25 is such that the nails pass through singly, and as each nail descends it is arrested at the upper end of the tube 23 by a pivoted dog 26 projecting into its path a sufficient distance to certainly engage its head. This dog is held in nail-engaging position by means of a spring 27.

A trip arm 28 is pivoted at 29 to an arm 30 secured to the pivot of the dog 26, and projects into the path of a trip 31 carried by one of the pull rods, as 20. As the hammer is moved upwardly by the action of the spring 21 the trip 31 engages below the arm 28 and turns the dog 26, releasing the nail K and permitting it to drop into the tube 13. As the hammer is drawn down the trip 31 passes the trip arm 28, turning it on its pivot, and this latter arm is immediately returned to its normal position by the action of the spring 32.

Within the lower contracted end 14 of the tube 13 there is slidingly fitted a bushing 33, the bore of which is suitable to allow the passage of a nail therethrough while holding it in upright position. The downward movement of the bushing 33 is limited by a screw stud 34, projecting through a longitudinal slot in the tube section 14. As the machine is positioned for the driving of a nail the bushing 33 is moved upwardly a short distance by its engagement with the floor and insures the entry thereinto of the nail now within the body portion of the tube 13.

A punch or nail set 35, forming an element of the pneumatic hammer, is positioned to bear upon the nail when the latter occupies the bushing 33, and to drive it as the hammer is operated. The nail set 35 has a limited longitudinal movement within the lower end of the barrel of the hammer to permit the latter to be advanced after each blow is struck.

The operation of the device, as will be understood from the foregoing description, is as follows:—

Assuming that the feed tube 25 is filled with spikes, and that one has been driven, the machine rests on the spot, the operator standing with one foot on the pedal 16 and the other on the floor. He now takes a step forward, keeping one foot on the pedal, and then lifts the machine to the new position, at the same time releasing slightly the pressure on the pedal so as to permit the springs 21, 21, to raise the hammer and thus release a spike, which drops obliquely into the tube 13. During the forward movement the free end of the hinged pedal is permitted to drag along the floor. At the new position the machine is dropped in place, and is there held against accidental removal by the claws 15, the bushing 33 being forced upwardly relative to the tube 14, thus straightening the spike so that it is ready to be driven into the floor.

The operator now presses the lever of the air controlling valve 12 with his thumb, and at the same time steps on the pedal 16, thus lowering the hammer and pressing the set into contact with the spike. The set is allowed a small amount of play within the hammer barrel because of the recess 36, and the head of the spike may therefore be driven by the air pressure slightly below the level of the floor without injury to the hammer.

The pressure on the pedal is released, and another spike is automatically dropped into the tube 13 on the upward movement of the hammer. The operator again moves the machine to a position slightly in advance of the last one and then drops the machine in place, keeping his foot always on the pedal 16. It is found that by the use of this machine very rapid nailing can be accomplished, and it is of particular value in nailing the flooring of cars, where heavy spikes are used and rapid operation is essential. The device is a unitary structure, all of whose parts combine in rendering the whole efficient.

We claim as our invention—

1. In a nailing machine, in combination, a tube provided with a nail box at its lower end, a spring-retracted pneumatic hammer reciprocable in the tube, and a pedal for advancing the hammer pivoted at one end to the hammer below said spring and having its other end adapted to drag along the floor.

2. A movable nailing machine comprising, in combination, a tube, a spring-retracted hammer in said tube, a handle therefor, and a pedal for advancing the hammer pivoted thereto at one end and having its other end adapted to drag along the floor.

3. A movable nailing machine comprising, in combination, a tube, a spring-retracted hammer reciprocable in the tube, and a pedal for advancing the hammer having one end adapted to drag along the floor.

4. In a nailing device, in combination, a tube having a nail-positioning nipple, a spring-retracted pneumatic hammer reciprocable in the tube, and a pedal for advancing the hammer pivoted at one end to said hammer and having its other end adapted to drag along the floor.

5. A movable nailing machine comprising, in combination, a suitable frame, a spring-retracted hammer having a handle, and a pedal for advancing the hammer and having one end adapted to drag along the floor when the machine is moved forward.

6. In a nailing machine, the combination of a frame, a pneumatic hammer slidably mounted on the frame, resilient means for holding the hammer in raised position, a pedal for lowering the hammer, and means independent of said hammer and its operating mechanism for conducting a nail to position beneath the hammer, said hammer being adapted to be given a plurality of reciprocations for driving each nail.

7. In a nailing machine, the combination of a portable frame, a pneumatic hammer slidably mounted on the frame, resilient means for holding the hammer in raised position, means for lowering the hammer to operative position against the resistance of said resilient means for changing its zone of reciprocation, means for holding a nail in driving position beneath said hammer, said means being independent of the element into which the nail is to be driven, said frame including a passage leading to said nail-holding means, a normally closed gate in said passage, and a trip operated by the upward movement of said hammer in returning to inoperative position after driving a nail, for opening said gate.

8. In a nailing machine, the combination of a comparatively light, portable frame adapted to be moved about over a floor for driving nails therein, a pneumatic hammer slidably mounted on the frame, a resilient means for holding the hammer in raised position, means for lowering the hammer to operative position against the resistance of said resilient means for changing its zone of reciprocation, means for holding a nail in driving position beneath said hammer, said frame including a passage leading to said nail-holding means, a resiliently mounted gate controlling said passage, and a trip moving with said hammer while the latter is moving to inoperative position after driving a nail, for opening said gate.

9. In a nailing machine, the combination of a tube, a pneumatic hammer slidably mounted in said tube, a spring for normally holding said hammer in raised inoperative position, means for lowering said hammer to operative position against the resistance of said spring, means independent of the last named means and said spring, for operating the hammer to drive the nail, and means controlled by the movement of said hammer to inoperative position for conducting a nail to driving position beneath said hammer.

10. In a portable nailing machine, the combination of a frame having means to support a nail in position to be driven, a power hammer constructed to deliver a plurality of blows in quick succession and slidably mounted on the frame above the nail supporting means, yielding means for normally holding the hammer in raised position, means for lowering the hammer, and means independent of said yielding means for operating the hammer to drive a nail.

11. In a portable nailing machine, the combination of a frame having means to support a nail in position to be driven, a conduit leading from a position convenient to the hand of the operator to the nail supporting means, a power hammer constructed to deliver a series of blows in quick succession and slidably mounted on the frame, yielding means for normally holding said hammer in raised position, means for lowering hammer to change its zone of reciprocation, and means for operating said hammer.

12. In a portable nailing machine, the combination of means to support a nail in position to be driven, a power hammer constructed to deliver a series of blows in quick succession, means to yieldingly support the hammer above a nail in the nail supporting means and adapted to permit the hammer to be lowered into driving engagement with the nail, and means to control the operation of the hammer.

13. In a portable nailing machine, the combination of means to support a nail in position to be driven, a power hammer constructed to deliver a series of blows in quick succession, means to yieldingly support the hammer above a nail in the nail supporting means and adapted to permit the hammer to be lowered into driving engagement with the nail, means to control the operation of the hammer, and means at a height convenient to the operator's hand for receiving a nail and delivering it to the nail supporting means.

14. In a floor nailing machine, the combination of means to support a nail in position to be driven, a power hammer, a nail set in said hammer constructed to deliver a series of blows in quick succession upon a nail in said supporting means, means to yieldingly support the hammer above a nail in the nail supporting means and adapted to permit the hammer to be lowered into driving engagement with the nail, means to control the operation of the hammer, means at the height convenient to the operator's hand for receiving a nail and delivering it to the nail supporting means, and means to engage the floor to hold the machine in place during the driving operation.

15. In a nailing machine, the combination of means to support a nail in position to be driven, means including a power hammer for delivering a series of blows in quick succession on each nail, means to control the operation of the hammer, and means to grip the floor and prevent the machine from shifting its position while the hammer is in operation.

16. In a nailing device, the combination of a frame, a hammer slidably mounted on said frame, a nail set reciprocally mounted relatively to said hammer, and mechanism operated by the upward movement of said hammer for delivering a nail beneath said nail set to be driven thereby.

WILLIAM N. OEHM.
GOMERT POWELL.